June 15, 1937. G. N. EDWARDS 2,084,018
RUNNING BOARD COVER
Filed June 30, 1934
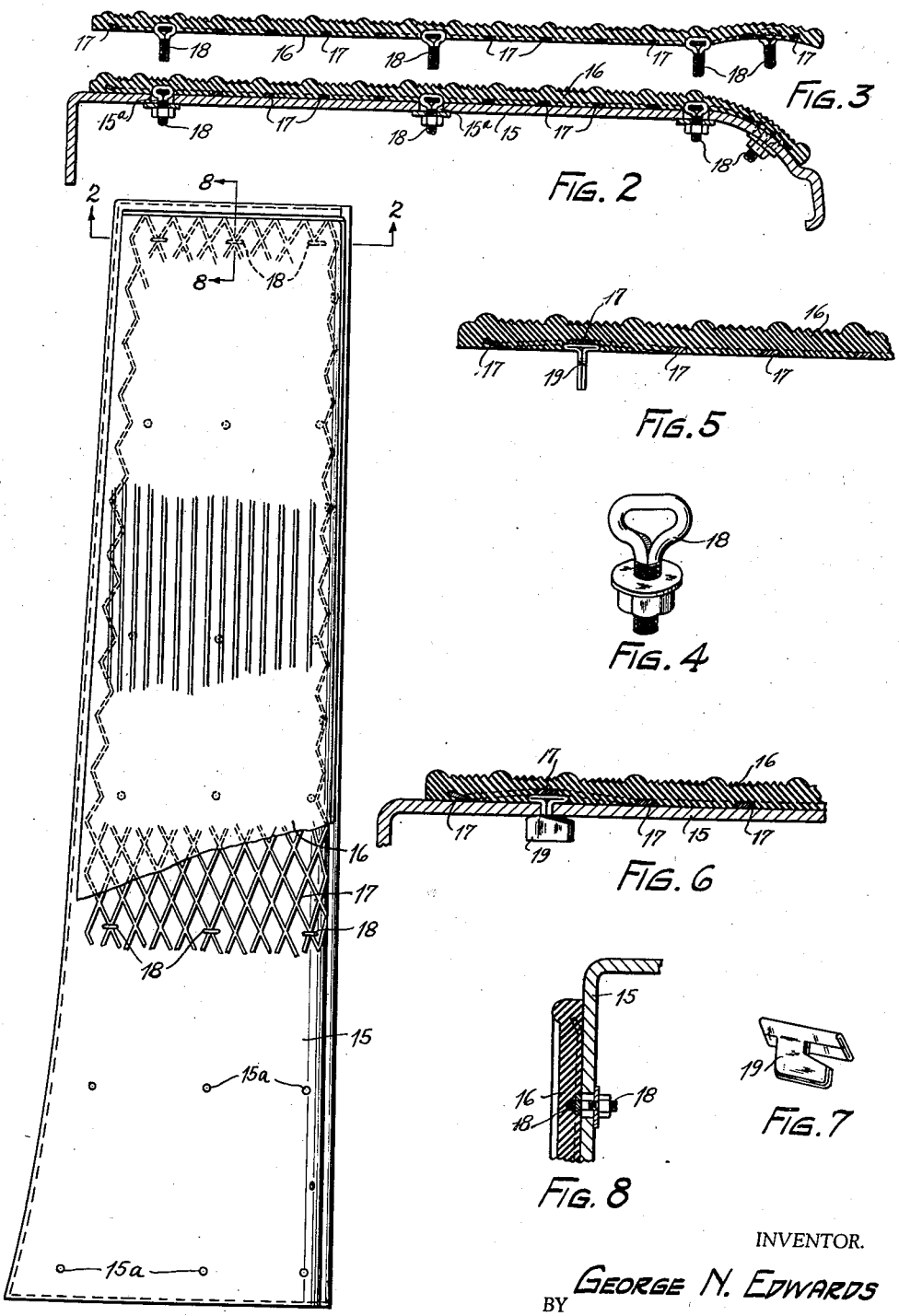
INVENTOR.
GEORGE N. EDWARDS
BY Kuris, Hudson & Kent
ATTORNEY.

Patented June 15, 1937

2,084,018

UNITED STATES PATENT OFFICE 2,084,018

RUNNING BOARD COVER

George N. Edwards, Willoughby, Ohio, assignor to The Ohio Rubber Company, Willoughby, Ohio, a corporation of Ohio Application June 30, 1934, Serial No. 733,283

5 Claims. (Cl. 280—169)

This invention relates to covers for automobile running boards and the like.

It has been customary practice in recent years, in fact almost universal practice, to cover automobile running boards with rubber which is vulcanized directly to the boards. The covering of running boards in this manner has proved to be very satisfactory in so far as permanence of attachment, wearing qualities, and appearance are concerned, but the recent stream-lining of automobiles has involved the use of deeply drawn and curved running boards, greatly increasing the cost of the molds used in vulcanizing the rubber to the running boards and in some instances making desirable the fastening of the covers to the running boards by mechanical fastening means.

The principal object of the present invention therefore is to provide a flexible cover molded from rubber or other suitable composition of a plastic nature and having provision for fastening or both reenforcing and fastening of a nature such that the cover can be applied to and made to conform with the irregular shape of the board and will lie flat thereon over its entire area and be securely fastened thereto in a permanent manner.

The above and other objects are attained by the present invention which may be briefly summarized as consisting in certain novel details of construction and combinations and arrangements of parts which will be described in the specification and set forth in the appended claims.

In the accompanying sheet of drawings wherein I have shown a preferred embodiment of the invention and also certain modifications, Fig. 1 is a plan view of the cover embodying one form of my invention and applied to a running board, a portion of the cover being broken away.

Fig. 2 is an enlarged transverse sectional view of the same substantially along the line 2—2 of Fig. 1.

Fig. 3 is a transverse sectional view of the cover removed from the board and with the front edge portion molded on a curve so that it may more readily assume the form shown in Fig. 2.

Fig. 4 is a perspective view of one of the fasteners illustrated in Figs. 2 and 3.

Fig. 5 is a fragmentary transverse sectional view showing a modification in the form of fastening clip employed.

Fig. 6 is a similar view showing a portion of the cover applied to the running board and illustrating the manner in which the shank of the clip is turned to fasten the cover to the board.

Fig. 7 is a perspective view of the clip employed with the modification shown in Figs. 5 and 6, and Fig. 8 is a longitudinal sectional view substantially along the line 8—8 of Fig. 1.

Referring now to the drawing, and first to Figs. 1 and 2, 15 represents a running board body which is generally formed of sheet metal and in this instance is curved downwardly at the front and is flanged downwardly at the rear and would generally be flanged downwardly also at its ends. The board may be curved lengthwsie to conform with curvatures in adjacent parts of the automobile body such as the fenders. In this instance, the cover extends over substantially the whole area of the running board and is quite flexible throughout so that it will conform to all the curvatures of the board. While the part or body to which my improved cover is adapted to be applied is generally an automobile running board, since it there finds a wide field of use, the cover may be attached to other tread members or parts. Furthermore, while the tread portion of the cover is generally formed of soft vulcanized rubber, the term "rubber" as used herein is intended to cover equivalent or like materials which are initially in plastic form.

My improved cover includes an upper layer or sheet 16 of soft vulcanized rubber or equivalent material, as stated above, and a metal reenforcement 17 which in this instance is a sheet of so-called expanded metal of well known form which is embedded in the lower part of the rubber layer substantially flush with the lower surface thereof, as indicated in the drawing, and preferably this sheet of expanded metal extends on the lower side of substantially the whole area of the rubber layer 16, i. e., from substantially end to end and substantially side to side thereof. This sheet of expanded metal is formed by cutting and then expanding or stretching laterally a rather thin sheet of metal, such as steel, which is preferably treated, as by brass-plating, so as to increase the bond between the rubber and the metal. This sheet, therefore, has a mesh effect with diagonally disposed bars and diamond-shaped openings and, so far as certain features of the invention are concerned, a wire screen of large mesh may be employed for this purpose.

The bars of the expanded metal 17 at both ends of the cover and, if desired, also along both side edges may be turned or bent upwardly slightly so as to increase the bond between the rubber and the reenforcing sheet at and along the parts mentioned. This is illustrated in the drawing. In forming this reenforced rubber cover, the reenforcing sheet is placed in the bottom of the lower member of the vulcanizing press and then the sheet of unvulcanized rubber previously cut to size is placed on top of it. Then the press is closed and, during the molding and vulcanizing operation, the reenforcing sheet is embedded in the rubber and becomes securely united thereto.

To fasten this reenforced sheet to the running board body I preferably employ clips or mechanical fasteners which are preferably secured to the reenforcing sheet where the bars of adjoining diamonds diverge, which fasteners extend down from the lower side of the cover and are adapted to extend through openings in the running board body 15. These fasteners are applied to the reenforcing sheet before the latter is placed in the mold. They will, of course, be located sufficiently close together or at such points that when the cover is applied to the running board and secured thereto by the fasteners the cover will lie smoothly and closely on the flat and curved portions of the board.

In Figs. 2, 3, 4 and 8 I have shown fasteners 18 which straddle the junction points of the bars of the expanded metal sheet and which are split or divided lengthwise like a cotter pin. The heads of the fasteners are embedded in the rubber and the shanks extend from the lower side of the cover and through suitably formed and properly positioned openings 15a in the running board. These shanks are threaded, as illustrated in Fig. 4, and receive nuts which are adapted to be screwed onto the split threaded shanks tightly against the lower side of the running board 15.

In Figs. 5, 6 and 7 a still different type of clip or fastener 19 is illustrated, this fastener being formed from sheet metal and welded or otherwise secured to the expanded sheet at and adjacent the junction points of the bars as before. These clips have elongated shank portions, the shanks each having a lateral extension with a beveled top edge. These shanks are adapted to extend through elongated openings in the board and are then adapted to be twisted or turned so that the inclined or beveled edges of the shanks will have a camming effect on the lower side of the running board so as to pull the cover tightly down thereon.

Other types of fasteners may be employed and, in some instances, they may extend through the metal area at the junction of the bars, but in that case this area should be somewhat larger than illustrated so that the areas may be slotted to accommodate the shanks of the fastening devices which may be of the type illustrated in Figs. 5, 6 and 7.

The cover illustrated may be molded flat, or, if desired, the front edge may be molded on a curve such as indicated in Fig. 3 to insure the cover adhering closely to the front portion of the board.

Obviously, changes may be made in the constructions illustrated and I aim in my claims to cover all modifications which do not involve a departure from the spirit and scope of the invention.

Having thus described my invention, I claim:

1. A cover for running boards and the like comprising a sheet of rubber having a reenforcement embedded therein substantially flush with the lower face of the rubber and formed of an expanded strip of metal having openings or meshes formed by bars with junction points at intervals, and mechanical fasteners connected with the reenforcement at certain of the junction points and projecting from the lower side of the cover.

2. The combination with a running board having openings arranged at intervals, of a flexible cover therefor comprising a layer of relatively soft vulcanized rubber having a reenforcement embedded therein substantially flush with the lower face of the rubber in the form of expanded metal having openings defined by bars integrally united, and mechanical fasteners attached to the bars at the junction points thereof and extending from the lower side of the cover through said openings.

3. A cover for running boards and the like, comprising a sheet of rubber having a reenforcement formed of an expanded strip of metal having openings or meshes formed by bars with junction points at intervals, and mechanical fasteners having heads formed of doubled metal and engaging the reenforcement at certain of the junction points and split stems projecting from the lower side of the cover.

4. A cover for running boards and the like comprising a sheet of rubber having a reenforcement formed of an expanded strip of metal having openings or meshes formed by bars with junction points at intervals, and mechanical fasteners having eyes embracing the reenforcement at certain of the junction points and split stems projecting from the lower side of the cover.

5. A cover for running boards and the like comprising a sheet of rubber having a reenforcement formed of an expanded strip of metal having openings or meshes formed by bars with junction points at intervals, and mechanical fasteners having eyes embracing the reenforcement at certain of the junction points and split stems projecting from the lower side of the cover, the split stems of said fasteners being threaded.

GEORGE N. EDWARDS.